March 21, 1961 K. C. FINSTER 2,975,478
MIXING NOZZLE
Filed April 3, 1959

INVENTOR.
Kenneth C. Finster
BY Jerome Rudy
ATTORNEY

United States Patent Office 2,975,478
Patented Mar. 21, 1961

2,975,478

MIXING NOZZLE

Kenneth C. Finster, Lake Jackson, Tex., assignor to The Dow Chemical Company, Midland, Mich., a corporation of Delaware Filed Apr. 3, 1959, Ser. No. 803,855

4 Claims. (Cl. 18—30)

This invention relates to new and improved nozzles for injection molding. More specifically, the invention relates to highly advantageous color mixing nozzles for the dispersion of dry blended pigments with molten thermoplastic material during injection molding.

In conventional practice, finely divided coloring materials are mixed with granular thermoplastic resins at temperatures substantially below the softening point of such resins. Such a mixture is subsequently added to the polymer supply source of an injection molding machine. The mixture is first heated to a molten state, then intermittently injected into a mold cavity to form the desired article. During the heating and injection stages, it is desired that a uniform mixing of the pigmented material and the polymer is caused to occur.

Conventional color dispersion injection molding nozzles accomplish mixing by passing the molten polymer and finely divided pigment through a plurality of small openings, frequently alternately arranged. Other designs employ a complex arrangement of grooves or channels which alternately divide and combine the flowing stream of molten plastic. Mixing is thus obtained by virtue of the complex pattern of flow through the nozzle. Such nozzles are characterized by their high resistance to flow of molten thermoplastic material passing therethrough from the heating cylinder into the mold. Such a pressure drop is particularly disadvantageous as, with a given operating pressure, the rate of filling the mold cavity is reduced. This frequently yields inferior moldings or, if the normal injection molding cycle time is to be maintained, requires pressure to be employed in ranges that, in general, are not usually available in conventional equipment.

Frequently, nozzles designed for complex flow patterns have dead areas wherein the polymeric materials may reside for considerable periods through substantial numbers of molding cycles. This is particularly disadvantageous when used with polymeric materials not having high thermal stability. The decomposition of the held-up polymer that is lodged in such "dead" areas may give rise to undesired discontinuities within the molded article. Usually, nozzles that are designed to give complex flow patterns are not simple in construction and are relatively difficult to manufacture.

It would be advantageous to have available a color dispersion nozzle that would: (1) exhibit a minimum of pressure drop during the molding cycle; (2) be of relatively simple and straightforward mechanical design; (3) be easily cleaned; and (4) exhibit no tendencies to hold polymers within it for periods greater than one molding cycle.

It would be most advantageous if such a nozzle would be adapted to easily and readily provide a relatively homogeneous dispersion of pigment in molten polymer.

It would also be advantageous to have a nozzle available which would thoroughly and efficiently blend different grades and diverse varieties of polymer together.

These and other advantageous results and purposes and benefits may be achieved with apparatus in accordance with the present invention which comprises, in an injection molding nozzle, means defining a generally cylindrical conduit enclosing an internal longitudinal passageway, said passageway having an inlet end and a discharge end; the inner surface of the discharge end of said passageway terminating in a concave arcuate surface; a generally cylindrical orifice disposed coaxially with said conduit and positioned in said concave arcuate surface and passing therethrough, said orifice being in communication with said passageway in said conduit, the innermost portion of said orifice leading from said passageway in said conduit comprising a smaller cylindrical portion than said outermost portion passing out of said end of said conduit, said orifice increasing in diameter as it passes through and out of said discharge end of said conduit.

Nozzles according to the present invention may be effectively employed in injection molding operations to give efficient and thorough mixing of pigments and like materials. Lower pressure drops are exhibited by the color mixing nozzles of the invention than with conventional color mixing nozzles. This permits a desirably more rapid and economically advantageous operation of injection molding machines when dry blend coloring is being practiced.

Further features and advantages of the invention will be more apparent in the following description and specification, taken in connection with the accompanying drawing, wherein.

Figure 1:
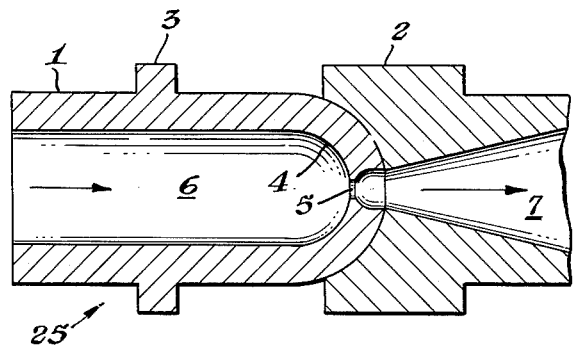
Figure 1 is a longitudinal cross-sectional view of the nozzle of the invention adjacent to a sprue bushing.

There is shown in Figure 1 of the drawing a nozzle that is in accordance with the present invention. The nozzle, indicated generally by the reference numeral 25, consists of a cylindrical conduit body 1 having a retaining shoulder or ridge 3 circumferentially disposed thereabout. The body 1 is formed into a concave arcuate inner surface 4 through which there is provided an orifice 5 in full communication and coaxial with a passageway 6. In association with the nozzle 25, there is illustrated a sprue bushing 2, having a passageway 7 formed therein, which leads to a suitable mold cavity (not shown).

Figure 2:
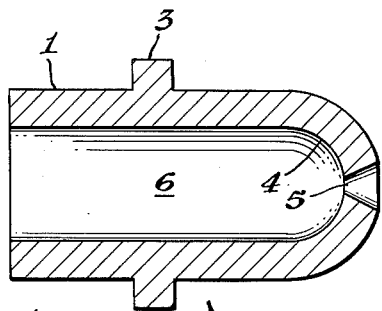
Figure 2 is a longitudinal cross-sectional view of a nozzle having an alternate orifice configuration.

In Figure 2, there is illustrated an alternate orifice 5 comprising an essentially cylindrical body portion 1 adjacent to the curved concave terminal wall 4. Contiguous and coaxial with the cylindrical portion is a frustoconical section providing an increase in orifice diameter as the distance from the wall 4 is increased.

Mixing is readily accomplished in the nozzle 25 of the invention as molten polymeric material is forced through the passageway 6 in the body 1 into and through orifice 5. The high linear velocities obtained and direction changes introduced at the junction of the terminal wall 4 and orifice 5 produce a region of high turbulence, wherein the molten polymer and associated particulate coloring material are effectively and efficiently interdispersed in a general uniform and satisfactorily homogeneous manner.

Figure 3:
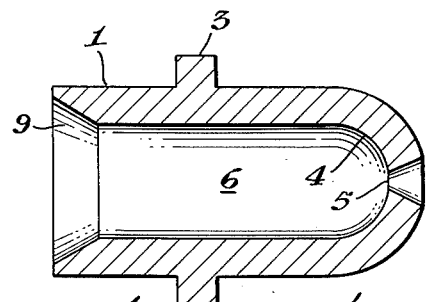
Figure 3 is a longitudinal cross-sectional view of a nozzle having a chamfered leading edge.
Figure 4:
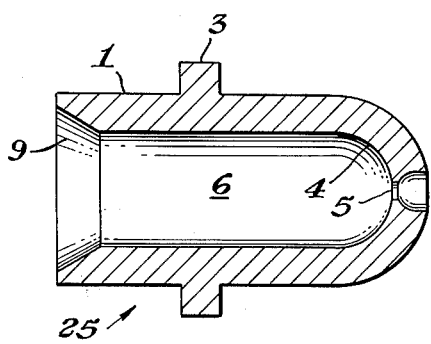
Figure 4 is a longitudinal cross-sectional view of a nozzle having a chamfered leading edge design as shown in Figure 1.

In Figures 3 and 4 of the drawing, there are illustrated nozzles in which a chamfered leading edge 9 has been provided at the inlet of the body 7. This minimizes the possibility of hold-up in the heating cylinders immediately adjacent to the color dispersion nozzle 25. The nozzle is attached to the discharge end of the heating cylinder in the injection molding machine (not shown) by any conventional means. For example, connection may be made by employing a nozzle having an externally threaded outer surface which is screwed into a mating internally threaded terminal portion located in the discharge end of the heating cylinder. An internally threaded retaining collar may be provided in the cylinder discharge in order to engage the shoulder 3 on the nozzle. Of course, mating external threads may also be provided on the discharge portion of the heating cylinder and a locking flange (likewise not shown), having an opening to engage said shoulder 3, may be rigidly attached to heating cylinder support means to better keep the nozzle in place.

As is apparent, the invention provides an injection molding nozzle having a generally hemispherical terminal portion. This gives maximum strength for the weight of material used in making the nozzle. Such an advantageous design results in excellent color mixing. It also allows a relatively small orifice to be employed so that only a relatively low resistance is offered to the passage of fluid material therethrough in contrast to nozzles of the prior art, wherein restricted passageways having considerabl length are employed. By reducing the length of the nozzle passageway without appreciably affecting the structural strength of the nozzle, greatly reduced pressure drops are obtained. High turbulence, as mentioned, is obtained at the restricted portion of the orifice 5 without any incurring of increased pressure drop.

The discharge opening of orifice 5 is generally made either equal to, or slightly smaller than the passageway 7 of the sprue bushing 2. It is usually desirable for the diameter of the orifice 5 to be between about ¼ and about ½ of the inside diameter of the nozzle body 1. In general, a most advantageous range for the diameter of the orifice 5 is between about 2/13 and about 2/15 of the internal diameter of the nozzle body 1.

The most advantageous mixing may generally be obtained by providing an orifice having an initial passageway of relatively small size and short length in full communication with and followed by a coaxial succeeding discharge passageway of larger diameter. Desirable mixing is also obtained with an orifice of generally frustoconical configuration having its smaller portion on the inner surface 4 of the injection nozzle and the larger portion adapted to engage the channel 7 in the sprue bushing.

Injection nozzles in accordance with the present invention having orifices of the same internal diameter as a standard taper bore injection molding nozzle ordinarily permit, under identical molding conditions, as much as 35 percent and more greater shot weight per injection to be obtained in comparison with that from a conventional tapered bore injection molding nozzle.

Figure 5:
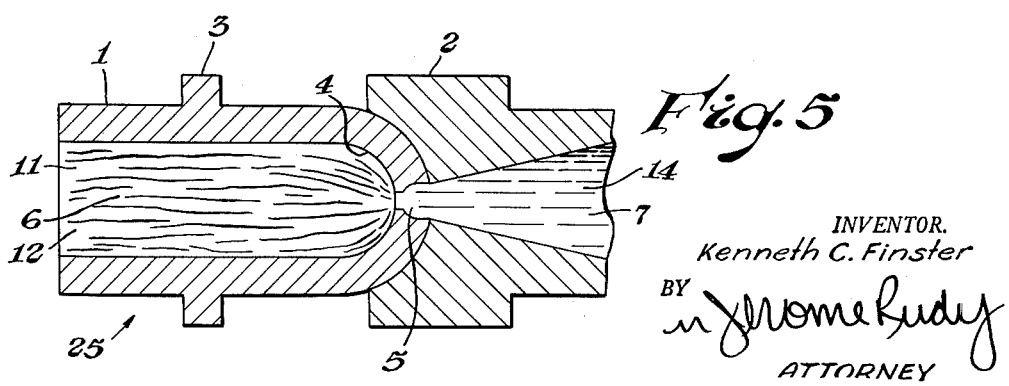
Figure 5 is a longitudinal cross-sectional view representing the operation of a nozzle in accordance with the instant invention.

Figure 5 illustrates the operation of a mixing nozzle according to the invention. Within passageway 6 are molen globules of polymer 11, the surfaces of which have finely divided pigment 12 generally distributed therewith. During the injection cycle, the polymer 11 and pigment 12 are forced toward the discharge orifice 5 and into the sprue bushing channel 7. As the material is advanced into the region of curved terminal surface 4, the cross-sectional area of the passageway decreases. This results in an increasing flow velocity of the polymer mass (composed of polymer 11 and pigment 12) moving toward orifice 5, together with an elongation and a streaming action which is imparted to the polymer globules 11. Maximum elongation and linear velocity both appear in the portion of orifice 5 that is adjacent to the internal arcuate surface 4. A change of flow direction, coupled with the relatively high flow velocity, generates a region of exceedingly high turbulence in the immediate vicinity of the orifice 5. Polymer and pigment passing through this area of high turbulence is thoroughly interdispersed and subsequently passed from the mixing orifice 5 into channel 7 in sprue bushing 2, to a suitable mold cavity (not shown).

A conventional tapered bore nozzle and a nozzle constructed in accordance with the invention were compared under identical molding conditions in the following manner:

A conventional twin shell blender was charged with 2 pounds of granular polyethylene. These granules were in a cylindrical form of about ⅛ inch diameter and 3/16 inch length. Together with the polyethylene, there was also charged to the blender about 0.908 gram (0.1 weight percent, based on polyethylene weight) of "Kreiger Turquoise L-137-3," an inorganic turquoise colored pigment manufactured by and obtained from the Kreiger Color and Chemical Company. The thus charged blender was rotated at about 34 r.p.m. for about 5 minutes, yielding a dry blended mixture of polyethylene and pigment.

This dry blended mixture of polymer and pigment was then placed in the supply hopper of a 2–3 ounce Van Dorn injection molding machine (Model Number H-200), manufactured by The Van Dorn Iron Works, employing the following conditions after surging with comparable unpigmented polymer:

| | |
|---|---|
| Injection time _____ seconds__ | 8 |
| Stuffing time _____ do____ | 6 |
| Cure time _____ do____ | 40 |
| Mold water _____ ° F__ | 111 |
| Back heating zone control temperature set point _____ ° F__ | 350 |
| Front heating zone control temperature set point _____ ° F__ | 350 |
| Back heating zone recorded temperature _____ ° C__ | 176 |
| Front heating zone recorded temperature _____ ° C__ | 180 |

A disc mold was employed, the cavity of which was 5½ inches in diameter and 0.075 inch deep. The nozzles used in tests were of equal outside dimension.

Nozzle 1 was constructed in accordance with the illustration of Figure 3 of the drawing. The diameter of its passageway 6 was ⅝ inch and the dimensions of its orifice 5 were: smaller diameter 0.067 inch; larger diameter 3/16 inch; length 3/16 inch. The major diameter of the chamfer 9 was 1 inch and the angle of chamfer about 30°.

Nozzle 2 was constructed in accordance with Figure 4 of the drawing. The diameter of its passageway 6 was ⅝ inch and the dimensions of its orifice 5 were: smaller diameter 0.067 inch; length of smaller cylindrical portion 0.002 inch, counter bored with a 3/16 inch in diameter ball-end end mill.

Nozzle 3 was a conventional tapered bore nozzle of the following dimensions: orifice diameter 0.067 inch; orifice length 3/16 inch; maximum diameter of taper bore 1 inch; length of taper bore 1¾ inches.

Discs were molded at injection pressures of 400 pounds per square inch and at increments of 100 until a hydraulic pressure of 1400 pounds per square inch was reached. The injection pressure was maintained for a period of about 5 seconds. The resulting discs were weighed and inspected for uniformity of color dispersion. Results obtained from these moldings are set forth in the following Table I.

*Table I*

| Pressure | Nozzle 1 | | Nozzle 2 | | Nozzle 3 | |
|---|---|---|---|---|---|---|
| | Wt. in Grams | Color | Wt. in Grams | Color | Wt. in Grams | Color |
| 400 | 3.3 | Fail | 3.6 | Fail | 3.1 | Poor. |
| 500 | 6.0 | Fair | 5.0 | Fair | 4.0 | Do. |
| 600 | 8.0 | Excellent | 9.5 | Excellent | 5.8 | Do. |
| 700 | 10.7 | ___do___ | 11.5 | ___do___ | 8.6 | Do. |
| 800 | 14.6 | ___do___ | 15.3 | ___do___ | 10.7 | Do. |
| 900 | 21.0 | ___do___ | 17.0 | ___do___ | 15.0 | Do. |
| 1,000 | 28.0 | ___do___ | 29.0 | ___do___ | 21.5 | Fair. |
| 1,100 | 28.5 | ___do___ | 31.2 | ___do___ | 24.5 | Do. |

As is readily apparent in the foregoing tabulation, the nozzles 1 and 2, constructed in accordance with the present invention, gave excellent color mixing. In addition thereto, they exhibited significantly lower back pressure, or, conversely, passed larger shots to the mold cavity for a given injection pressure than was obtained with the conventional nozzle.

In the molding of a dispersion of polystyrene and dry pigment under like molding conditions with conventional taper bore nozzles and the nozzle of the invention, moldings obtained with the conventional taper bore nozzle exhibited distinct and marked variations giving a clear indication of the flow pattern within the mold, whereas the moldings produced with the nozzle of the invention appeared to be entirely homogeneous.

Similar results are obtained when the nozzle of the present invention is employed to disperse pigment in other thermoplastic resinous polymeric materials, as for example, other polyolefins, such as polypropylene, polyhaloalkenes, such as polyvinylchloride, vinylchloride vinylidene chloride copolymers; alkenyl aromatic polymers, such as polystyrene and polyvinyltoluene; polymers of various monovinyl esters, such as polyvinylacetate, polyvinylpropionate; polyamides, such as nylon "6–6" and nylon "6"; cellulosics, such as ethyl cellulose and cellulose acetate; and the like.

Reduced purge time is obtained when employing nozzles in accordance with the invention as illustrated by the following additional illustration.

Molding conditions and feed stock, with the exception of injection pressure which was 1100 pounds per square inch, were identical with that of the previous exemplification. Colored material was fed to the hopper and molding continued until the hopper was empty. Uncolored material was added to the hopper and the number of molding cycles required to give a substantially colorless disc recorded. The results of this test are shown in Table II.

Table II

| Nozzle: | Molding cycles |
|---|---|
| 1 | 5 |
| 2 | 5 |
| 3 | 11 |

From the results demonstrated in Table II, it is evident that more rapid purging is obtained with the nozzles made in accordance with the invention. This capability of rapid purging also reduces inventory time of polymeric material within the melting zone of the injection molding machine. It also materially reduces the possibility of thermal decomposition of the polymeric material during the molding and heating operation. With nozzles in accordance with the invention, appearance of streaks in the molding during the purge cycles is entirely absent.

As is apparent, the apparatus is susceptible of being embodied with various alterations and modifications from that which has been described in the preceding description and specification. Therefore, it is to be fully understood that all of the foregoing is merely intended to be illustrative and is not to be construed or interpreted as being restrictive or otherwise limiting of the present invention, excepting as it is set forth and defined in the appended claims.

What is claimed is:

1. An injection molding nozzle comprising means defining a generally cylindrical conduit enclosing an internal longitudinal passageway, said passageway having an inlet end and a discharge end; one inner surface of the discharge end of said passageway terminating in a concave arcuate surface; a generally cylindrical orifice, disposed coaxial with said conduit, positioned in said concave arcuate surface and passing therethrough, said orifice being in communication with said passageway in said conduit; the innermost portion of said orifice leading from said passageway in said conduit comprising a smaller cylindrical portion than said outermost portion passing out of said end of said conduit, said orifice increasing in diameter as it passes through and out of said discharge end of said conduit.

2. The nozzle of claim 1, wherein said smaller cylindrical portion adjacent to said inner surface is at least 0.001 inch in length.

3. The nozzle of claim 1, wherein the ratio of said smaller generally cylindrical portion adjacent to said inner surface diameter to conduit diameter is from about 1:4 to 1:12, respectively.

4. The nozzle of claim 1, wherein said orifice has a generally frustoconical configuration.

References Cited in the file of this patent

UNITED STATES PATENTS

| 2,386,966 | MacMillin | Oct. 16, 1945 |
| 2,443,554 | De Mattia | June 15, 1948 |
| 2,494,777 | Patterson et al. | Jan. 17, 1950 |